United States Patent
Sugaya (10) Patent No.: US 11,543,836 B2
(45) Date of Patent: Jan. 3, 2023

(54) UNMANNED AERIAL VEHICLE ACTION PLAN CREATION SYSTEM, METHOD AND PROGRAM

(71) Applicant: OPTIM CORPORATION, Saga (JP)

(72) Inventor: Shunji Sugaya, Tokyo (JP)

(73) Assignee: OPTIM CORPORATION, Saga (JP)

(*) Notice: Subject to any disclaimer, the term of this patent is extended or adjusted under 35 U.S.C. 154(b) by 448 days.

(21) Appl. No.: 16/608,966

(22) PCT Filed: Apr. 28, 2017

(86) PCT No.: PCT/JP2017/016935
§ 371 (c)(1),
(2) Date: Apr. 10, 2020

(87) PCT Pub. No.: WO2018/198313
PCT Pub. Date: Nov. 1, 2018

(65) Prior Publication Data
US 2020/0317335 A1    Oct. 8, 2020

(51) Int. Cl.
G05D 1/10 (2006.01)
B64C 39/02 (2006.01)
B64D 47/08 (2006.01)

(52) U.S. Cl.
CPC .......... *G05D 1/10* (2013.01); *B64C 39/024* (2013.01); *B64D 47/08* (2013.01); *B64C 2201/027* (2013.01); *B64C 2201/123* (2013.01)

(58) Field of Classification Search
CPC .. G05D 1/10; B64C 39/024; B64C 2201/027; B64C 2201/123; B64D 47/08
See application file for complete search history.

(56) References Cited

U.S. PATENT DOCUMENTS 6,178,253 B1 * 1/2001 Hendrickson ............. G06T 7/40
382/110
9,508,263 B1 * 11/2016 Teng .................... B64C 39/024
(Continued)

FOREIGN PATENT DOCUMENTS

CA    2945186 A1    10/2015
CN    105046909 A   11/2015
(Continued)

OTHER PUBLICATIONS

DJI GS PRO User Manual V. 1.2 (2017), GSP, pp. 1-18.
International Search Report issued in PCT/JP2017/016935 dated Aug. 1, 2017.

*Primary Examiner* — Peter D Nolan
*Assistant Examiner* — Kenneth M Dunne
(74) *Attorney, Agent, or Firm* — Norton Rose Fulbright US LLP; James R. Crawford (57) ABSTRACT

Provided are an action plan making system and method for an unmanned aerial vehicle, and a storage medium. The action plan making system (1) includes: an unmanned aerial vehicle (10), provided with an aerial shooting device; and a computer (30). A control unit of the computer (30) executes a making module (324), which makes an action plan including a flight plan and a shooting plan of the unmanned aerial vehicle (10) according to a region accepted by executing a region acceptance module (322) and a purpose accepted by executing a purpose acceptance module (323). A control unit (14) of the unmanned aerial vehicle (10) executes a control module (141), and controls the aerial shooting of a camera (17) and flying of the unmanned aerial vehicle (10) based on the action plan made by executing the making module (324) by the control unit (32) of the computer (30).

7 Claims, 4 Drawing Sheets

(56) References Cited

U.S. PATENT DOCUMENTS

| | | | | |
|---|---|---|---|---|
| 9,618,940 | B1* | 4/2017 | Michini | G06Q 50/16 |
| 10,175,362 | B2* | 1/2019 | Redden | G01N 33/0098 |
| 10,313,575 | B1* | 6/2019 | Wingo | B64C 39/024 |
| 10,331,931 | B2* | 6/2019 | Aldor-Noiman | G06K 9/00 |
| 10,627,386 | B2* | 4/2020 | Saez | G01N 33/02 |
| 11,294,369 | B2* | 4/2022 | Lee | B64C 39/024 |
| 11,319,067 | B2* | 5/2022 | Yanagishita | H04N 7/18 |
| 11,361,184 | B2* | 6/2022 | Aldor-Noiman | G06K 9/6247 |
| 2014/0312165 | A1* | 10/2014 | Mkrtchyan | G06V 20/188 |
| | | | | 244/13 |
| 2016/0078570 | A1* | 3/2016 | Ethington | G06Q 10/06 |
| | | | | 705/7.21 |
| 2016/0133039 | A1* | 5/2016 | Ritter | G06T 3/4038 |
| | | | | 345/629 |
| 2016/0302351 | A1* | 10/2016 | Schildroth | A01B 79/005 |
| 2016/0334276 | A1* | 11/2016 | Pluvinage | G01J 3/28 |
| 2017/0021941 | A1* | 1/2017 | Fisher | B64C 39/024 |
| 2017/0069214 | A1* | 3/2017 | Dupray | G08G 5/0021 |
| 2017/0076612 | A1* | 3/2017 | Takahashi | G05D 1/0016 |
| 2017/0199528 | A1* | 7/2017 | Detweiler | G05D 1/0646 |
| 2017/0287082 | A1* | 10/2017 | Karube | G06Q 50/02 |
| 2017/0334559 | A1* | 11/2017 | Bouffard | G05D 1/0202 |
| 2017/0336203 | A1* | 11/2017 | Barnes | G01S 17/88 |
| 2017/0374323 | A1* | 12/2017 | Gornik | H04N 7/185 |
| 2020/0050189 | A1* | 2/2020 | Gu | G05D 1/10 |

FOREIGN PATENT DOCUMENTS

| | | | | |
|---|---|---|---|---|
| CN | 106585992 A | | 4/2017 | |
| JP | 2006-027448 A | | 2/2006 | |
| JP | 2016082441 A | | 5/2016 | |
| WO | 2015/163012 A1 | | 10/2015 | |
| WO | WO-2016065071 A1 * | | 4/2016 | A01G 23/00 |
| WO | 2016/178268 A1 | | 11/2016 | |
| WO | WO-2017077543 A1 * | | 5/2017 | G06K 9/00 |

\* cited by examiner

Action plan database 334

| | | Purpose | Soybean pest detection | Laver red rot detection | ... |
|---|---|---|---|---|---|
| Flight plan | Flight route | | make a reciprocating route for flying without intervals in the region | make a reciprocating route for flying without intervals in the region | ... |
| | Flight altitude | | 2m in the sky | 5m in the sky | ... |
| | Flight speed | | 0.5m/s | 0.5m/s | ... |
| | ⋮ | | ⋮ | ⋮ | ⋮ |
| Shooting plan | Camera angle | | Shoot from above to directly below | Shoot from above to directly below | ... |
| | Camera resolution | | Medium (6 million pixels) | high (13 million pixels) | ... |
| | ⋮ | | ⋮ | ⋮ | ⋮ |

FIG.5

UNMANNED AERIAL VEHICLE ACTION PLAN CREATION SYSTEM, METHOD AND PROGRAM

This application is a national phase under 35 U.S.C. § 371 of International Application No. PCT/JP2017/016935 filed Apr. 28, 2017, the entire contents of which is incorporated herein by reference in its entirety.

TECHNICAL FIELD

The present disclosure relates to an action plan making system and an action plan making method for an unmanned aerial vehicle and a program.

BACKGROUND

So far, laver cultivation has been extensively carried out in the sea. It is known that when laver is cultivated, a disease called red rot may occur. In this disease, bacteria parasitizes the laver, generating rust-red spots and causing the laver's thalli to break. In laver cultivation, prevention of laver diseases, especially the red rot, has become an important topic.

Similarly, in fields, preventing pests from attaching to crops leading by soybean plants and rice plants has become an important topic.

In addition, in a case where diseases occur on laver and in fields, in order to prevent the diseases from spreading, it is necessary to quickly grasp places the diseases occur and promptly take appropriate measures to the places. Be that as it may, the scale of laver and crop cultivation is as wide as tens of thousands of square meters, and it takes a lot of labor to quickly and reliably grasp the places the diseases occur.

To reduce labor, an approach is proposed to shoot laver farms and fields from the sky and determine whether there is any disease based on the shot images. Compared with the case of using an actual airplane or helicopter, using aerial shooting of an unmanned aerial vehicle can reduce costs. In addition, the shooting can be performed safely at a low altitude and at a narrow place, and the shooting can be performed close to a shooting target. Therefore, high-quality photos and videos can be obtained, and implementations in various aspects such as confirming a maintenance status of a structure, inspecting from a height and ground observation from a height can be achieved.

For aerial shooting using the unmanned aerial vehicle, a method is proposed, in which a distance between the vehicle body and the shooting target is measured during the flight of the unmanned aerial vehicle, and according to the measurement result, a zoom ratio of a camera is determined to shoot the shooting target (for example, reference may be made to patent document 1). According to this method, the camera mounted on the unmanned aerial vehicle may be used to accurately enlarge an image of the shooting target to a sufficient size in the camera frame, and the image can be captured and recorded as high-precision image data.

DOCUMENT OF THE EXISTING ART

Patent Document

Patent Document 1: Japanese Laid Open Patent Publication No. 2006-027448.

SUMMARY

Problem to be Solved in the Disclosure

Furthermore, a technique for making a flight plan on a map before enabling the unmanned aerial vehicle to fly, where the unmanned aerial vehicle is not manually operated by the operator but operates automatically, is proposed. When making the unmanned aerial vehicle automatically fly and shoot aerially, various parameters should be set, such as the flight route, the flight altitude, the flight speed, the camera angle and the camera resolution. These parameters depend on shooting purposes such as detecting red rot of the laver, detecting pest attachment on soybean crops. Therefore, ideally, these parameters are set as automatically as possible without manual operation according to the shooting purposes.

The present disclosure is accomplished for the above expectation, and aims at providing an action plan making system for simplifying input of parameters required by automatic flight and aerial capturing of an unmanned aerial vehicle.

Solution to the Problem

The present disclosure provides the following solutions.

A first feature of the disclosure provides an action plan making system for an unmanned aerial vehicle, including: a region acceptance unit, which accepts a designation of a flight region of the unmanned aerial vehicle provided with an aerial shooting device on a map; a purpose acceptance unit, which accepts input of a purpose making the unmanned aerial vehicle fly in the flight region; and a making unit, which makes an action plan including a flight plan and a shooting plan of the unmanned aerial vehicle according to the flight region and the purpose.

According to the first feature of the disclosure, the action plan making system is provided. The making unit makes the action plan including the flight plan and the shooting plan of the unmanned aerial vehicle according to the region accepted by the region acceptance unit and the purpose accepted by the purpose acceptance unit. The region is accepted by the region acceptance unit and the purpose of aerial shooting is accepted by the purpose acceptance unit. Therefore, a flight plan such as a flight route, a flight altitude, and a flight speed, and a shooting plan such as a camera altitude and a camera resolution are correctly set to match the accepted region and purpose. Thus an action plan making system for simplifying input of parameters required by automatic flight and aerial shooting of the unmanned aerial vehicle is provided.

A second feature of the disclosure provides an action plan making system for an unmanned aerial vehicle, in the first feature of the disclosure, further including: a map display unit which displays the map, where the region acceptance unit accepts the designation of the flight region of the unmanned aerial vehicle based on a result of drawing on the map displayed by the map display unit.

According to the second feature of the disclosure, the flight region of the unmanned aerial vehicle can be designated based on the result of drawing on the map displayed by the map display unit. Accordingly, an action plan making system which is easier for the operator to set is provided.

A third feature of the disclosure provides an action plan making system, in the first or second feature of the disclosure, a purpose includes at least one of detecting pests attached to harvested crops or detecting lesions of the harvested crops.

The scale of laver and crop cultivation is as wide as tens of thousands of square meters, and it takes a lot of labor to quickly and reliably grasp the places the diseases occur. Based on the third feature of the disclosure, making an action plan matching the purpose of at least one of detecting pests attached to harvested crops or detecting lesions of the harvested crops is able to save labor required by detecting pests attached to harvested crops and detecting lesions of the harvested crops.

A fourth feature of the disclosure provides an action plan making system, in any one of the first to third features of the disclosure, the flight plan includes at least one of a flight route, a flight altitude or a flight speed of the unmanned aerial vehicle, the shooting plan includes at least one of a camera angle or a camera resolution of the aerial shooting device.

According to the fourth feature of the disclosure, an action plan making system is provided, and sets the following contents: the flight plan, including at least one of the flight route, the flight altitude or the flight speed of the unmanned aerial vehicle, and the shooting plan, including at least one of the camera angle or the camera resolution of the aerial shooting device. Therefore, input of the parameters required for the automatic flight and aerial shooting of the unmanned aerial vehicle is simplified.

A fifth feature of the disclosure provides an action plan making system, in any one of the first to fourth features of the disclosure, further comprising: a control unit, which controls flying of the unmanned aerial vehicle and aerial shooting of the aerial shooting device based on the action plan made by the making unit.

According to the fifth feature of the disclosure, an action plan making system is provided. Since flying of the unmanned aerial vehicle and aerial shooting of the aerial shooting device are controlled based on the action plan made by the making unit, the input of the parameters required by the automatic flight and aerial shooting of the unmanned aerial vehicle is simplified.

Effect of the Disclosure

According to the present disclosure, an action plan making system is provided, which can simplify input of parameters required by automatic flight and aerial shooting of an unmanned aerial vehicle.

DETAILED DESCRIPTION

Specific embodiments will be described below with reference to the accompanying drawings. It is to be noted that the embodiments are merely examples and not intended to limit the scope of the present disclosure.

<Compositions of an Action Plan Making System 1 for an Unmanned Aerial Vehicle>

Figure 1:
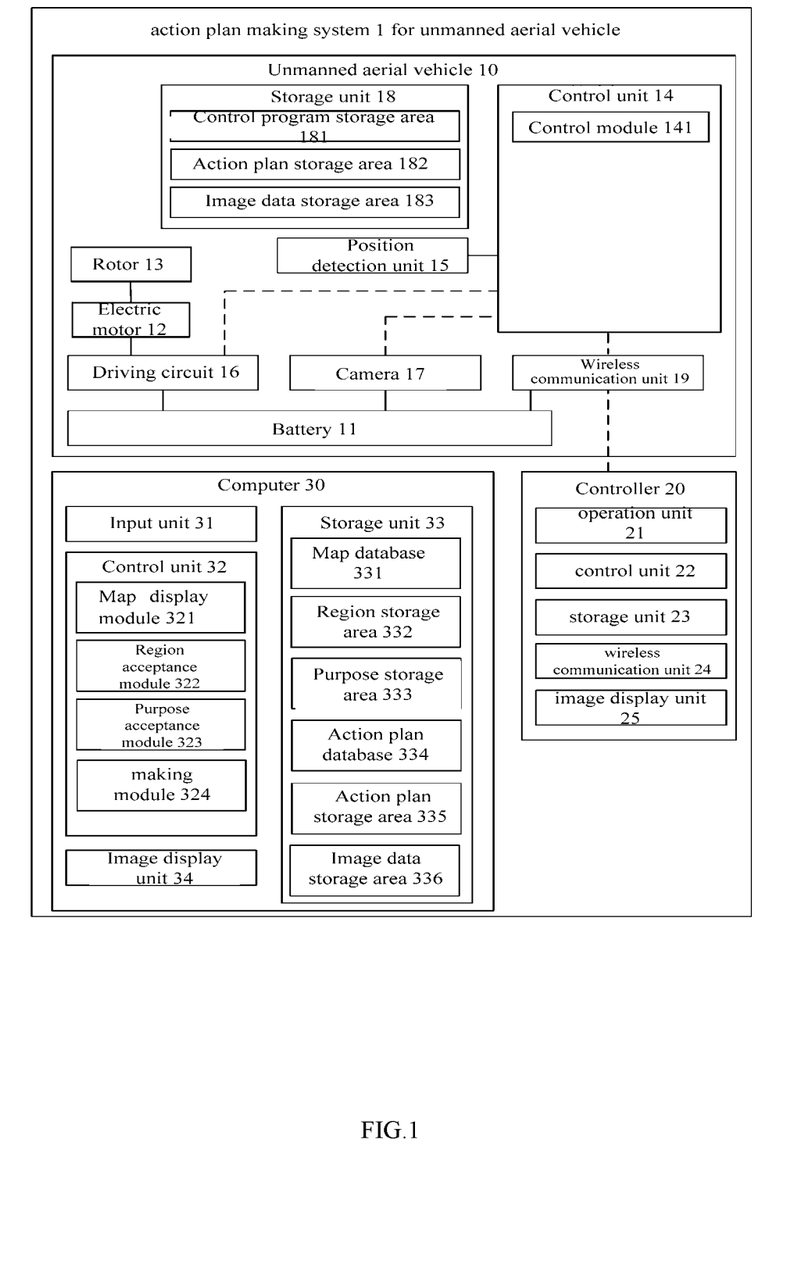
FIG. 1 is a block diagram illustrating hardware composition and software functions of an action plan making system 1 for an unmanned aerial vehicle 10 of an embodiment.

FIG. 1 is a block diagram illustrating hardware composition and software functions of the action plan making system 1 of an embodiment. The action plan making system 1 includes: an unmanned aerial vehicle 10, provided with an aerial shooting device; a controller 20, which is connected with and is able to wirelessly communicate with the unmanned aerial vehicle 10 to control the unmanned aerial vehicle 10; and a computer 30, which inputs a flight route of the unmanned aerial vehicle 10 and edits images shot by the unmanned aerial vehicle 10. It is to be noted that in the embodiment, automatic control of the unmanned aerial vehicle 10 may be appropriately performed. In case of automatically controlling the unmanned aerial vehicle 10, the controller 20 may not be provided.

(Unmanned Aerial Vehicle 10)

The unmanned aerial vehicle 10 may be a device capable of shooting a shooting target from the air, and is not particularly limited. For example, the unmanned aerial vehicle 10 may be a radio-controlled aircraft or an unmanned aerial vehicle called a drone. Hereinafter, the unmanned aerial vehicle 10 is described as a drone.

The unmanned aerial vehicle 10 includes: a battery 11 which functions as a power source of the unmanned aerial vehicle 10; an electric motor 12 which performs an action with power supplied by the battery 11; and a rotor 13 which rotates due to the action of the electric motor 12 to enable the unmanned aerial vehicle 10 to rise and fly.

In addition, the unmanned aerial vehicle 10 includes: a control unit 14 which controls an action of the unmanned aerial vehicle 10; a position detection unit 15 which transmits position information of the unmanned aerial vehicle 10 to the control unit 14; a driving circuit 16 which drives the electric motor 12 according to a control signal from the control unit 14; a camera 17 which performs aerial shooting on the shooting target according to a control signal from the control unit 14; and a storage unit 18 which stores in advance control programs and the like executed by a microcomputer of the control unit 14, and stores images shot by the camera 17.

Moreover, the unmanned aerial vehicle 10 includes a wireless communication unit 19 which performs wireless communication with the controller 20.

The above components are mounted on a main body structure (a frame, etc.) having a predetermined shape. The main body structure (the frame, etc.) having a predetermined shape may have the same structure as an existing drone.

(Battery 11)

The battery 11 is a primary battery or a secondary battery, and supplies power to each component in the unmanned aerial vehicle 10. The battery 11 may be fixed to the unmanned aerial vehicle 100, or may be detachable.

(Electric Motor 12, Rotor 13)

The electric motor 12 functions as a driving source for rotating the rotor 13 with the power supplied by the battery 11. The unmanned aerial vehicle 10 is able to rise and fly through rotation of the rotor 13.

(Control Unit 14)

The control unit 14 includes a central processing unit (CPU), a random access memory (RAM), a read only memory (ROM) and the like.

In addition, the control unit 14 implements a control module 141 by reading a predetermined program.

The control unit 14 controls the electric motor 12 to control flying of the unmanned aerial vehicle 10 (controls ascent, descent, and horizontal movement of the unmanned aerial vehicle 10). In addition, the control unit 14 uses a gyroscope (not shown in the drawings) mounted on the unmanned aerial vehicle 10 to control the motor 12 to control a posture of the unmanned aerial vehicle 10.

(Position Detection Unit 15)

The position detection unit 15 is configured to include a laser imaging detection and ranging (LIDAR) technology and a global positioning system (GPS) technology. A latitude, a longitude and an altitude of an actual flying position of the unmanned aerial vehicle are detected by using the LIDAR technology and GPS technology together.

(Driving Circuit 16)

The driving circuit 16 has a function of applying a voltage specified by a control signal from the control unit 14 to the electric motor 12. In this way, the driving circuit 16 is able to drive the electric motor 12 according to the control signal from the control unit 14.

(Camera 17)

The camera 17 functions as an aerial shooting device. The camera 17 converts optical images taken by lens into image signals by an imaging element such as a charge coupled device (CCD) or a complementary metal oxide semiconductor (CMOS), i.e., performs camera shooting. A type of the camera 17 may be appropriately selected according to an image analysis approach for the shooting target.

(Storage Unit 18)

The storage unit 18 is a device for storing data and files and includes a data storage unit implemented by a hard disk, a semiconductor memory, a recording medium, a memory card or the like. The storage unit 18 includes: a control program storage area 181, which is for storing the control programs executed by the microcomputer of the control unit 14 in advance; an action plan storage area 182, which is for storing an action plan stored in the storage unit 33 of the computer 30 and transferred via a portable recording medium such as a universal serial bus (USB) memory and a secure digital (SD) card; and an image data storage area 183, which stores image data shot by the camera 17 and three-dimensional coordinate data (data corresponding to latitude, longitude, and altitude of a shooting position point of an image shot by the camera 17) detected by the position detection unit 15.

It is to be noted that the images constituting the image data may be static images or dynamic images. In addition, data stored in the image data storage area is able to be transferred to the computer 30 via a portable recording medium such as a USB memory or an SD card.

(Wireless Communication Unit 19)

The wireless communication unit 19 is configured to perform wireless communication with the controller 20 and receive a remote control signal from the controller 20.

(Controller 20)

The controller 20 has a function of controlling the unmanned aerial vehicle 10. The controller 20 includes: an operation unit 21 which is used when a user controls the unmanned aerial vehicle 10; a control unit 22 which controls actions of the controller 20; a storage unit 23 which stores control programs executed by a microcomputer of the control unit 22 in advance; a wireless communication unit 24 which performs wireless communication with the unmanned aerial vehicle 10; and an image display unit 25 which displays a predetermined image to the user.

The wireless communication unit 24 is configured to perform wireless communication with the unmanned aerial vehicle 10 and receive a remote control signal from the unmanned aerial vehicle 10.

The image display unit 25 may be integrated with a control device controlling the unmanned aerial vehicle 10 or may be separated from the control device. If the image display unit is integrated with the control device, the number of devices used by the user can be reduced, thereby improving convenience. In a case of being separated from the control device, the image display unit 25 may be a portable terminal device such as a tablet terminal and a smart phone capable of wirelessly connecting with the wireless communication unit 19 of the unmanned aerial vehicle 10. The case where the image display unit 25 is separated from the control device has an advantage that the image display unit 25 can be applied to a scenario where an existing control device does not include the image display unit 25.

(Computer 30)

The computer 30 has a function of inputting an action plan of the unmanned aerial vehicle 10 and a function of displaying an image shot by the unmanned aerial vehicle 10 on an image display unit 34. The computer 30 includes: an input unit 31 for inputting instruction information by the user, a control unit 32 which controls actions of the computer 30, a storage unit 33 which stores in advance control programs executed by a microcomputer of the control unit 32, and the image display unit 34 for displaying a predetermined image to the user.

The control unit 32 reads a predetermined program to implement a map display module 321, a region acceptance module 322, a purpose acceptance module 323, and a making module 324.

The storage unit 33 includes: a map database 331 which stores map information of a surrounding area of a place for aerial shooting; a region storage area 332 which stores information about a flight region of the unmanned aerial vehicle 10 input by the user; a purpose storage area 333 which stores information about a flight purpose of the unmanned aerial vehicle 10 input by the user; an action plan database 334, which is a database of an action plan including a flight plan and a shooting plan of the unmanned aerial vehicle; an action plan storage area 335, which stores an action plan made by the control unit 32; and an image data storage area 336, which stores image data stored in the storage unit 18 of the unmanned aerial vehicle 10 and transferred via a portable recording medium such as a USB memory or an SD card.

<A Flowchart of an Action Plan Making Method Using the Action Plan Making System 1>

Figure 2:
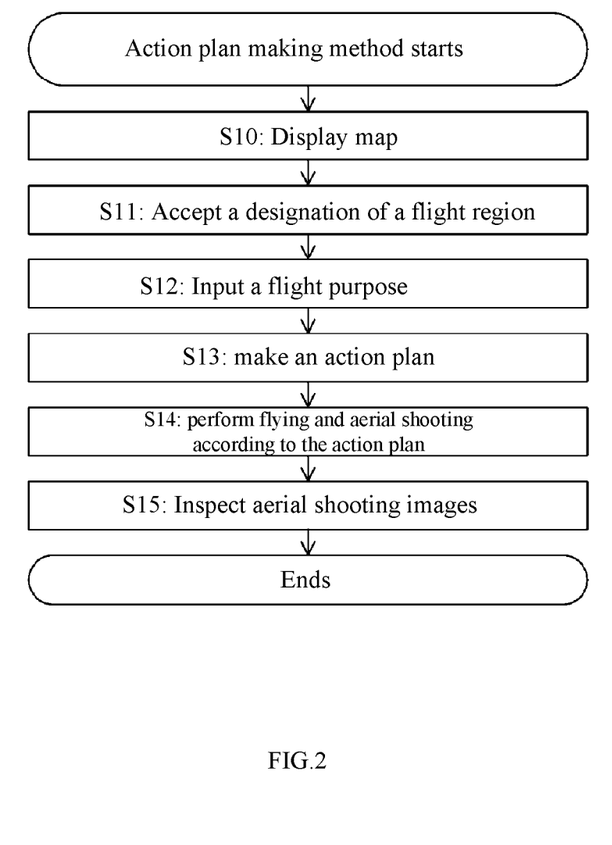
FIG. 2 is a flowchart of an action plan making method of an embodiment.

FIG. 2 is a flowchart of an action plan making method using the action plan making system 1. Processes performed by the above-mentioned hardware and software modules will be described.

(In Step S10: A Map is Displayed)

First, the control unit 32 of the computer 30 of the action plan making system 1 executes the map display module 321 and refers to the map database 331 to display a map of a surrounding area of a predetermined area where the unmanned aerial vehicle 10 flies on the image display unit 34.

(In Step S11: A Designation of a Flight Region is Accepted)

Next, the control unit 32 of the computer 30 executes the region acceptance module 322, and accepts a designation of a flight region of the unmanned aerial vehicle 10 provided with the camera 17 on the map displayed on the image display unit 34.

The user draws on the map displayed on the image display unit 34 to input the flight region of the unmanned aerial vehicle 10. Operations or approaches for inputting the flight region are not particularly limited, which may be an input operation performed via a mouse or a touch panel.

Figure 3:
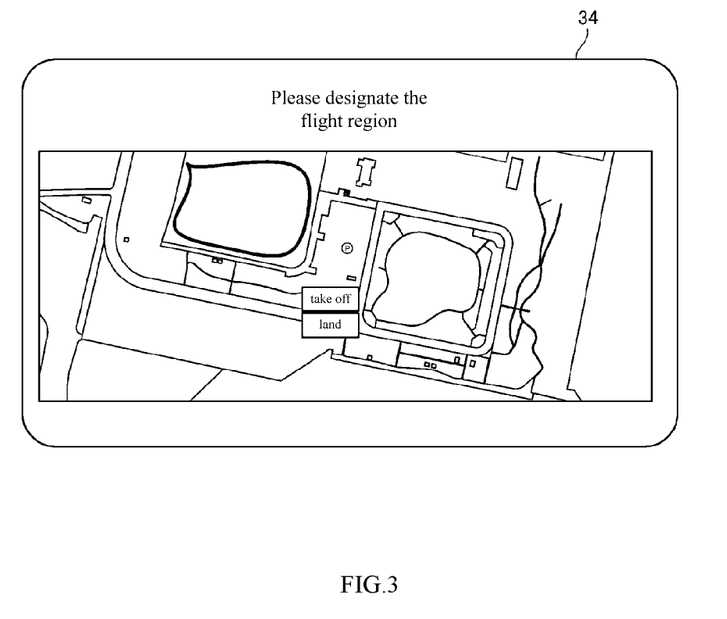
FIG. 3 shows an example of what displayed by an image display device 34 when inputting a flight region.

FIG. 3 shows an example of what displayed on the image display unit 34 at this moment. The image display unit 34 displays a map of the surrounding area of the predetermined area where the unmanned aerial vehicle 10 flies. Moreover, taking off and landing positions, as well as information prompting the user to input the flight region are displayed on the map.

Information of a predetermined flight route input by the user is stored in the region storage area 332.

(In Step S12: A Flight Purpose is Input)

Next, the control unit 32 of the computer 30 executes the purpose acceptance module 323 and accepts input of a purpose of making the unmanned aerial vehicle 10 fly to the flight region accepted in the step S11. Operations or approaches for inputting the flight purpose are not particularly limited, which may be an input operation performed via the mouse or the touch panel.

Figure 4:
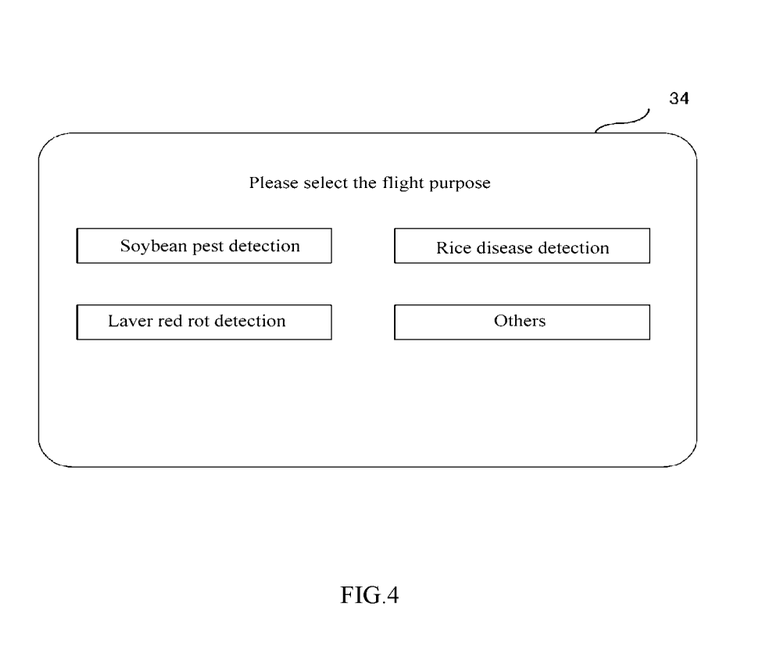
FIG. 4 shows an example of what displayed by an image display device 34 when inputting a flight purpose.

FIG. 4 shows an example of what displayed on the image display unit 34 at this moment. The image display unit 34 displays characters "please select the flight purpose", below which "soybean pest detection", "rice disease detection", "laver red rot detection" and "others" are displayed as options. When "others" is selected, a new option may be added by inputting characters.

Information of the flight purpose input by the user is stored in the purpose storage area 333.

(In Step S13: An Action Plan is Made)

Next, the control unit 32 of the computer 30 executes the making module 324, which makes the action plan including a flight plan and a shooting plan of the unmanned aerial vehicle 10 according to the flight region accepted in the step S11 and the purpose accepted in the step S12.

In this step, the control unit 32 refers to an action plan database 334 stored in the storage unit 33 in advance.

Figure 5:
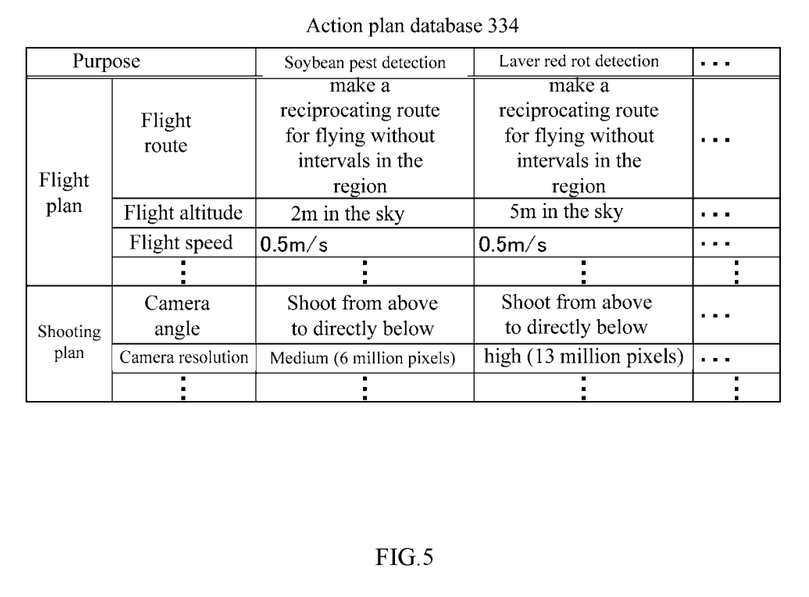
FIG. 5 shows an example of an action plan database 334.

FIG. 5 shows an exemplary outline of an action plan database 334. In the action plan database 334, action plans of the unmanned aerial vehicle 10 corresponding to flight purposes are registered.

The action plan is configured to include the flight plan and the shooting plan. The flight plan indicates flight conditions of the unmanned aerial vehicle 10, including the flight route, the flight altitude, and the flight speed, etc. The shooting plan indicates shooting conditions of the camera 17 mounted on the unmanned aerial vehicle 10, including the camera angle and the camera resolution.

For example, a laver farm on the sea is designated as the flight region and laver red rot detection is designated as the flight purpose.

In this case, the control unit 32 sets the flight route of the flight plan to "make a reciprocating route for flying without intervals in the region", and the control unit 32 sets the flight altitude of the flight plan to be "2 m in the sky" and sets the flight speed of the flight plan to be "0.5 m/s". In this case, the control unit 32 makes the following reciprocating route: the shooting may be performed without intervals in the flight region when shooting from 2 m in the sky in the flight region set in the step S11.

In addition, the control unit 32 sets the camera angle of the shooting plan to be "shoot from above to directly below", and sets the camera resolution of the shooting plan to be "high (13 million pixels)".

The information made in the step S13 is stored in the action plan storage area 335. The information stored in the action plan storage area 335 may be configured to be in the action plan storage area 182 of the unmanned aerial vehicle 10 via a portable recording medium such as a USB memory or an SD card.

It is to be noted that, preferably, information of the action plan database 334 is appropriately updated by artificial intelligence (AI) learning of actual flights. In addition, preferably, information of the action plan database 334 is appropriately updated whenever a new flight purpose is added in the step S12.

(In Step S14, Flying and Aerial Shooting are Performed According to the Action Plan).

Next, the control unit 14 of the unmanned aerial vehicle 10 executes the control module 141 to control the flying of the unmanned aerial vehicle 10 and the aerial shooting of the camera 17 according to conditions set in the action plan storage area 182.

Data of aerial images taken by the camera 17 is stored in the image data storage area 183. It is to be noted that the images may be static images or dynamic images.

Then when the action plan ends, the control unit 14 of the unmanned aerial vehicle 10 stops the aerial shooting performed by the camera 17 and makes the unmanned aerial vehicle 10 land. Then the information stored in the image data storage area 183 is configured to be in the image data storage area 336 of the computer 30 via a portable recording medium such as a USB memory or an SD card.

(In Step S15: Aerial Images are Inspected)

Next, the control unit 32 of the computer 30 reads the image data storage area 336 and displays the aerial images obtained in the step S14 on the image display unit 34. Through this step, the user is able to achieve expected flight purposes of "soybean pest detection", "rice disease detection", "laver red rot detection" and the like. When the processing of the step S15 ends, the action plan making system 1 ends a series of processes of the action plan making method of the embodiment.

According to embodiments of the disclosure, the control unit 32 of the computer 30 executes the making module 324, which makes an action plan including a flight plan and a shooting plan of the unmanned aerial vehicle 10 according to a region accepted by executing the region acceptance module 322 and a purpose accepted by executing the purpose acceptance module 323. Therefore, the action plan, including the flight plan such as the flight route, the flight altitude and the flight speed and the shooting plan such as the camera altitude and the camera resolution, is correctly set to match the accepted region and purpose. Thus, an action plan making system 1 for simplifying input of parameters required by automatic flight and aerial shooting of an unmanned aerial vehicle 10 is provided.

In addition, in the embodiments of the disclosure, preferably, when the control unit 32 enables the image display unit 34 to display a map, and the control unit 32 executes the region acceptance module 322, the designation of the flight region of the unmanned aerial vehicle is accepted based on a result of drawing on the map displayed by the image display unit 34. Accordingly, an action plan making system 1 with easier setting by the operator is provided.

Moreover, in the embodiments of the disclosure, preferably, a purpose accepted by executing of the purpose acceptance module 323 includes at least one of detecting pests attached to harvested crops or detecting lesions of the harvested crops. The scale of laver and crop cultivation is as wide as tens of thousands of square meters, and it takes a lot of labor to quickly and reliably grasp the places where the diseases occur. According to the embodiments of the disclosure, an action plan matching the purpose of at least one of detecting pests attached to harvested crops or detecting lesions of the harvested crops is made, which saves labor required by detecting pests attached to harvested crops and detecting lesions of the harvested crops.

Moreover, in the embodiments of the disclosure, the flight plan preferably includes at least one of the flight route, the flight altitude or the flight speed of the unmanned aerial vehicle 10, and the shooting plan preferably includes at least one of the camera angle or the camera resolution of the camera 17. Thus, an action plan making system 1 for simplifying input of parameters required by automatic flight and aerial shooting of the unmanned aerial vehicle 10 is provided.

Moreover, in the embodiments of the disclosure, preferably, the control unit 14 of the unmanned aerial vehicle 10 executes the control module 141, and controls aerial shooting of the camera 17 and flying of the unmanned aerial vehicle 10 based on the action plan made by executing the making module 324 by the control unit 32 of the computer. Thus, flying of the unmanned aerial vehicle 10 and aerial shooting of the camera 17 are controlled based on the action plan made through execution of the making module 324. Therefore, the action plan making system 1 for simplifying input of parameters required by automatic flight and aerial shooting of the unmanned aerial vehicle 10 is provided.

The above units and functions are implemented by reading and executing specified programs by a computer (including a CPU, an information processing apparatus and various terminals). The programs are provided and recorded in a computer-readable recording medium such as a floppy disk, a compact disk (CD) (such as a compact disc read-only memory (CD-ROM)), and a digital versatile disc (DVD) (such as a DVD-ROM and a DVD random access memory (DVD-RAM)). In this case, the computer reads the programs from the recording medium and transfers the programs to an internal storage device or an external storage device for storage and execution. Furthermore, the programs may alternatively be recorded in advance on a storage device (recording medium) such as a magnetic disk, an optical disk or a magneto-optical disk, and provided from the storage device to the computer via a communication line.

The embodiments of the present disclosure have been described above, but the present application is not limited to the above embodiments. Furthermore, the effects described in the embodiments of the present disclosure are merely illustrative of the most appropriate effects produced by the present application, and the effects of the present application are not limited to the effects described in the embodiments of the present disclosure.

LIST OF NUMERICAL REFERENCES

1: An action plan making system for an unmanned aerial vehicle;
10: Unmanned aerial vehicle;
11: Battery;
12: Electric motor;
13: Rotor;
14: Control unit;
141: Control module;
15: Position detection unit;
16: Driving circuit;
17: Camera;
18: Storage unit;
181: Control program storage area;
182: Action plan storage area;
183: Image data storage area;
19: Wireless communication unit;
20: Controller;
30: Computer;
31: Input unit;
32: Control unit;
321: Map display module;
322: Region acceptance module;
323: Purpose acceptance module;
324: Making module;
33: Storage unit;
331: Map database;
332: Region storage area;
333: Purpose storage area;
334: Action plan database;
335: Action plan storage area;
336: Image data storage area;
34: Image display unit.

What is claimed is:

1. An action plan making system for an unmanned aerial vehicle, comprising:
a region acceptance module, which accepts a designation of a flight region of the unmanned aerial vehicle provided with an aerial shooting device on a map;
a purpose acceptance module, which accepts input of a flight purpose of making the unmanned aerial vehicle fly in the flight region, wherein the flight purpose comprises at least one of detecting pests attached to harvested crops or detecting lesions of the harvested crops;
an action plan database, which is a database of an action plan including a flight plan and a shooting plan of the unmanned aerial vehicle, wherein the action plan database is updated by artificial intelligence learning of actual flights;
a making module, which makes the action plan comprising the flight plan, serving as a reciprocating route for shooting without intervals in the flight region, and the shooting plan in the flight region of the unmanned aerial vehicle that matches the flight purpose according to the action plan database;
a control unit which controls flying of the unmanned aerial vehicle and aerial shooting of the aerial shooting device based on the action plan made by the making module; and
a position detection unit which detects a latitude, a longitude and an altitude of a shooting position point of an image of pests or lesions on the harvested crops shot by a camera of the aerial shooting device to grasp a place the pests or lesions occurs;
wherein the flight plan comprises at least one of a flight route, a flight altitude or a flight speed of the unmanned aerial vehicle for detecting the pests attached to the harvested crops and/or the lesions of the harvested crops in the flight region; and
wherein the shooting plan comprises at least one of a camera angle or a camera resolution of the aerial shooting device for shooting the pests attached to the harvested crops and/or the lesions of the harvested crops in the flight region.

2. The action plan making system of claim 1, further comprising a map display module which displays the map, wherein the region acceptance module accepts the designation of the flight region of the unmanned aerial vehicle based on a result of drawing on the map displayed by the map display module.

3. The action plan making system of claim 1, wherein the flight purpose comprises at least one of soybean pest detection, rice disease detection, or layer red rot detection.

4. An action plan making method for an unmanned aerial vehicle, which is executed by an action plan making system, comprising:
   accepting a designation of a flight region of the unmanned aerial vehicle provided with an aerial shooting device on a map;
   accepting input of a flight purpose making the unmanned aerial vehicle fly in the flight region, wherein the flight purpose comprises at least one of detecting pests attached to harvested crops or detecting lesions of the harvested crops;
   making an action plan comprising a flight plan, serving as a reciprocating route for shooting without intervals in the flight region, and a shooting plan in the flight region of the unmanned aerial vehicle that matches the flight purpose according to an action plan database, the flight region and the purpose wherein the action plan database is a database of the action plan including the flight plan and the shooting plan of the unmanned aerial vehicle, wherein the action plan database is updated by artificial intelligence learning of actual flights;
   controlling flying of the unmanned aerial vehicle and aerial shooting of the aerial shooting device based on the action plan made by the making module; and
   detecting a latitude, a longitude and an altitude of a shooting position point of an image of pests or lesions on the harvested crops shot by a camera of the aerial shooting device to grasp a place the pests or lesions occurs;
   wherein the flight plan comprises at least one of a flight route, a flight altitude or a flight speed of the unmanned aerial vehicle for detecting the pests attached to the harvested crops and/or the lesions of the harvested crops in the flight region; and
   wherein the shooting plan comprises at least one of a camera angle or a camera resolution of the aerial shooting device for shooting the pests attached to the harvested crops and/or the lesions of the harvested crops in the flight region.

5. The action plan making method of claim 4, wherein the flight purpose comprises at least one of soybean pest detection, rice disease detection, or layer red rot detection.

6. A non-transitory storage medium storing a program, which, when executed by a processor of an action plan making system for an unmanned aerial vehicle, implements an action plan making method for the unmanned aerial vehicle, wherein the method comprises:
   accepting a designation of a flight region of the unmanned aerial vehicle provided with an aerial shooting device on a map;
   accepting input of a flight purpose making the unmanned aerial vehicle fly in the flight region, wherein the flight purpose comprises at least one of detecting pests attached to harvested crops or detecting lesions of the harvested crops;
   making an action plan comprising a flight plan, serving as a reciprocating route for shooting without intervals in the flight region, and a shooting plan in the flight region of the unmanned aerial vehicle that matches the flight purpose according to an action plan database, the flight region and the purpose wherein the action plan database is a database of the action plan including the flight plan and the shooting plan of the unmanned aerial vehicle, wherein the action plan database is updated by artificial intelligence learning of actual flights;
   controlling flying of the unmanned aerial vehicle and aerial shooting of the aerial shooting device based on the action plan made by the making module; and
   detecting a latitude, a longitude and an altitude of a shooting position point of an image of pests or lesions on the harvested crops shot by a camera of the aerial shooting device to grasp a place the pests or lesions occurs;
   wherein the flight plan comprises at least one of a flight route, a flight altitude or a flight speed of the unmanned aerial vehicle for detecting the pests attached to the harvested crops and/or the lesions of the harvested crops in the flight region; and
   wherein the shooting plan comprises at least one of a camera angle or a camera resolution of the aerial shooting device for shooting the pests attached to the harvested crops and/or the lesions of the harvested crops in the flight region.

7. The non-transitory storage medium of claim 6, wherein the flight purpose comprises at least one of soybean pest detection, rice disease detection, or layer red rot detection.

\* \* \* \* \*